Jan. 24, 1956    M. FUNKHOUSER ET AL    2,732,039
SHOCK ABSORBER CONTROL VALVE
Filed Nov. 20, 1952    2 Sheets-Sheet 1
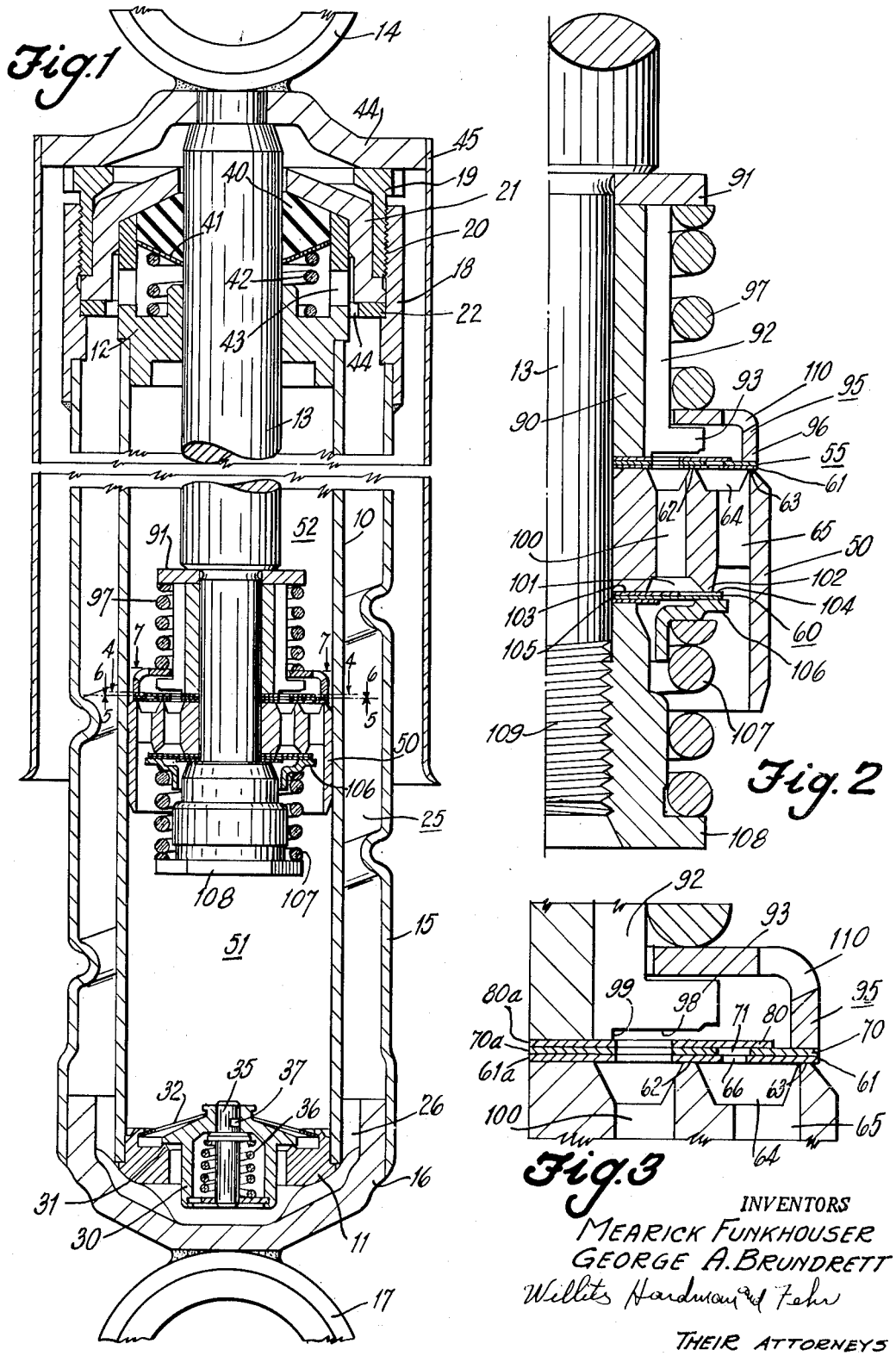
INVENTORS
MEARICK FUNKHOUSER
GEORGE A. BRUNDRETT
Willets Hardman and Fehr
THEIR ATTORNEYS Jan. 24, 1956 M. FUNKHOUSER ET AL 2,732,039
SHOCK ABSORBER CONTROL VALVE
Filed Nov. 20, 1952 2 Sheets-Sheet 2
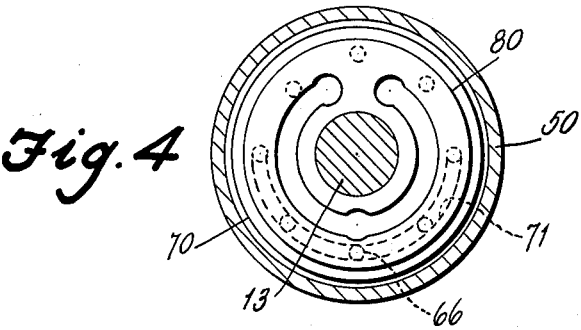
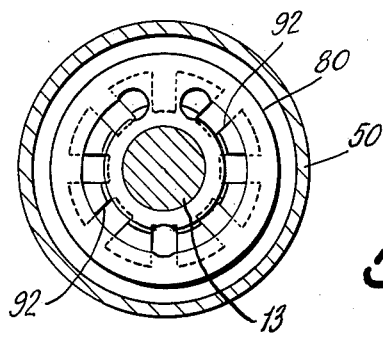
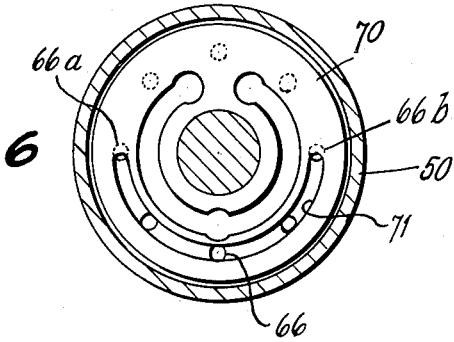
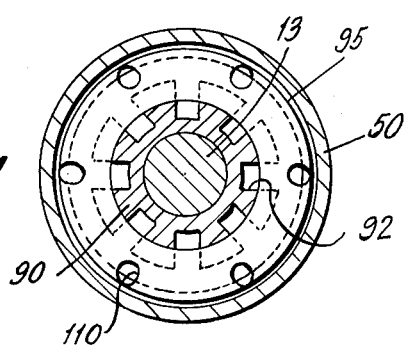
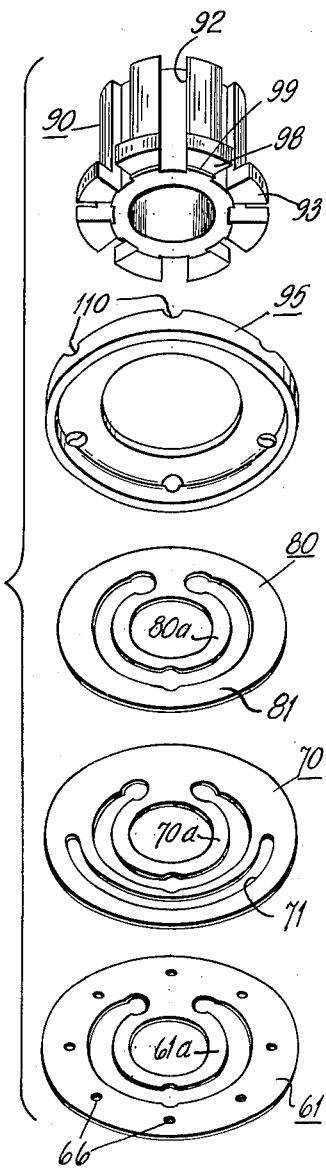
INVENTORS
MEARICK FUNKHOUSER
GEORGE A. BRUNDRETT
Willits Hardman and Fehr
THEIR ATTORNEYS

United States Patent Office 2,732,039
Patented Jan. 24, 1956

2,732,039
SHOCK ABSORBER CONTROL VALVE

Mearick Funkhouser, Dayton, Ohio, and George A. Brundrett, Detroit, Mich., assignors to General Motors Corporation, Detroit, Mich., a corporation of Delaware Application November 20, 1952, Serial No. 321,604

5 Claims. (Cl. 188—100)

This invention relates to hydraulic shock absorbers, and particularly to valve structures for controlling the flow of hydraulic fluid in the shock absorber.

An object of the invention is to provide a liquid flow control valve for regulating the flow of hydraulic fluid between opposite ends of a piston in a hydraulic shock absorber wherein the fluid is first controlled by a fixed orifice, and thereafter by a variable opening action of the valve.

Another object of the invention is to provide a flow control valve for hydraulic fluid during transfer between opposite ends of a piston in a hydraulic shock absorber wherein the valve provides for a fixed resistance to the flow of hydraulic fluid in one direction, which fixed resistance is closed against flow of hydraulic fluid in an opposite direction of flow.

Still another object of the invention is to provide a flow control valve for a hydraulic shock absorber that includes the combination of a disc valve member provided for variable flow through a passage, which disc valve member has one or more orifices therein to provide for a fixed resistance to flow of hydraulic fluid, and a check valve disc cooperating with the orifices to close off flow of hydraulic fluid in one direction of movement of the fluid in the hydraulic shock absorber.

Further objects and advantages of the present invention will be apparent from the following description, reference being had to the accompanying drawings wherein a preferred embodiment of the present invention is clearly shown.

In the drawings:

Figure 1 is a longitudinal cross-sectional view of a hydraulic shock absorber incorporating the features of this invention;

Figure 2 is an enlarged cross-sectional view of the piston of the device of Figure 1;

Figure 3 is a still further enlarged cross-sectional view of a portion of the piston illustrated in Figure 2, specifically illustrating one of the valve constructions thereon;

Figure 4 is a cross-sectional view taken along line 4—4, above the check valve disc, of Figure 1;

Figure 5 is a cross-sectional view taken along line 5—5, below the check valve disc, of Figure 1;

Figure 6 is a cross-sectional view taken along line 6—6, above the orifice flow control disc, of Figure 1;

Figure 7 is a cross-sectional view taken along line 7—7, above the valve cage, of Figure 1; and Figure 8 is an exploded perspective view of the valve assembly illustrated in Figures 2 and 3.

Referring to the drawings, the shock absorber comprises a cylinder 10 closed at the bottom end thereof by a base valve 11 and at the top by a cap 12. An actuating rod 13 is journalled in the cap 12, the cap forming a guide for the rod 13. The upper end of the rod 13 is connected to the spring mass of an automotive vehicle, such as the body, by means of a connector 14.

An outer cylinder 15 is positioned around the cylinder 10 and has the lower end thereof closed by a cap 16. The cap 16 carries a fitting 17 that connects with the unsprung mass of the automotive vehicle, such as the axle. The upper end of the outer cylinder 15 carries a fitting 18 that threadedly receives a nut 19 upon the threaded portion 20. The nut 19 retains a closure member 21 in position against a seal 22, thereby closing the space between the cylinders 10 and 15 whereby to provide a reservoir space 25 for hydraulic fluid. The reservoir space 25 connects with the interior of the cylinder 10 through the base valve 11, passages 26 being provided for flow of fluid between the reservoir and the interior of the cylinder 10.

The base valve 11 consists of a valve member 30 that is held on a valve seat 31 by means of a leaf spring 32. The valve 30 provides for an upward flow of fluid from the reservoir into the interior of the cylinder 10.

A valve member 35 is movable axially in the valve 30 and is urged upwardly by a compression spring 36. The valve 35 has an opening 37 connecting with a central drilled opening in the valve 35 to provide for flow of fluid from within the cylinder 10 into the reservoir.

The upper end of the shock absorber carries a resilient seal member 40 that is retained between the cap member 21 and a seal ring 41 that is spring-urged against the seal 40 by means of a compression spring 42. The seal 40 prevents leakage of hydraulic fluid from around the rod 13. Any hydraulic fluid passing upwardly along the rod 13 through the guide member 12 is returned to the reservoir chamber 25 through passages 43 and 44.

The rod 13 carries a flanged member 44 at the upper end thereof, the member 44 having a cylindrical shell 45 secured thereto forming a dust and stone shield around the body of the shock absorber.

A piston 50 slidable in the cylinder 10 is carried on the lower end of the actuating rod 13, the piston having suitable valved passages to control flow of hydraulic fluid between opposite ends of the piston and between the chambers 51 and 52 formed within the cylinder 10 by the position of the piston therein.

The piston 50 has a valve assembly 55 on one end thereof effective during the compression stroke of the shock absorber and a valve assembly 60 that is effective during the rebound stroke.

The valve assembly 55 comprises a valve disc 61 that is positioned upon a pair of annularly arranged annular valve seats 62 and 63 on one end of the piston 50. An annular recess 64 is provided between the valve seats 62 and 63, which recess has passages 65 extending therefrom to the opposite end of the piston.

The valve disc 61 has a plurality of orifices 66 therein to provide for a fixed restriction to the flow of hydraulic fluid through the passages 65 from the chamber 51 into the chamber 52.

Above the valve disc 61 there is placed an orifice flow control disc 70. The orifice flow control disc has an elongated arcuate slot 71 therein that aligns axially with the orifices 66 in the valve disc 61. The slot 71 in the orifice flow control disc 70 is of a length that is equal to a multiple of the distance between the orifice 66. Thus, irrespective of the radial position of the orifice flow control disc about the perimeter of the piston 50, there will always be exactly the same orifice area open for flow of hydraulic liquid through the valve 61.

As illustrated in Fig. 6, the arcuate slot 71 is exactly 180° in length. Thus, as the orifice 66a is closed by a portion of the disc 70, orifice 66b is starting to be opened. Thus, the arrangement is such that exactly the same orifice area will always be open irrespective of the position of the disc 70 on the valve disc 61.

A check valve disc 80 is positioned above the orifice flow control disc 70. This check valve disc 80 is somewhat smaller in diameter than either of the discs 70 or 61. The check valve disc 80 has the perimetral portion 81 axially aligned with the slot 71 in the orifice flow control disc 70 whereby to cover the slot 71 irrespective of its position around the perimeter of the piston 50.

A spacer member 90 is positioned above the check valve disc 80 and has one end thereof engaging a washer 91 on the rod 13. The lower end of the spacer 90 engages the central portions 61a, 70a and 80a of the discs 61, 70 and 80 whereby to retain the discs upon the piston 50.

The spacer 90 is circular in shape and has a plurality of flutes 92 in the side wall thereof. These flutes 92 extend downwardly through a horizontally disposed foot portion 93 on the lower end of the spacer 90. The flutes 92 provide for flow of hydraulic fluid through the piston 50 from the chamber 52 into the chamber 51, and vice versa.

A valve cage 95 is placed around the spacer 90, the spacer 90 axially positioning the valve discs 61, 70 and 80 relative to each other as well as the valve cage 95 relative to the aforesaid discs.

The valve cage 95 is cup-shaped and has the peripheral edge portion 96 that rests upon the orifice flow control disc 70 which in turn holds the valve disc 61 upon the valve seat 63. A compression spring 97 extends between the valve cage 95 and the washer 91 to resiliently hold the valve assembly 55 upon the valve seats 62 and 63.

The foot portion 93 of the spacer 90 has the lower face portion 98 thereof cut away to provide a shoulder 99 that clamps upon the valve assembly. The space between the face 98 of the foot portion 93 and the check valve 80 allows for free movement of the check valve in an upward direction to provide for free flow of hydraulic fluid through the orifices 66 provided in the valve disc 61 when fluid is moving from the chamber 51 into the chamber 52 of the shock absorber cylinder 10. The check valve disc 80 prevents return flow of hydraulic fluid from chamber 52 into chamber 51.

The piston 50 is provided with a plurality of passages 100 that connect with an annular recess 101 within the piston 50, a valve seat 102 being provided around the recess 101. An orifice disc 103 is placed upon the valve seat 102. The orifice disc 103 has a plurality of notches 104 therein providing for a fixed orifice restriction for flow of hydraulic fluid in either direction through the valve assembly 60. A valve disc 105 is placed upon the orifice disc 103.

A spring cage 106 receives one end of a compression spring 107 to resiliently urge the valve assembly 60 onto the valve seat 102. The opposite end of spring 107 engages a nut 108 that is threadedly received on the threaded end 109 of rod 13, the nut 108 also holding the piston and valve assembly heretofore described in assembled relationship.

In operation, on compression stroke of the shock absorber, that is, on upward movement of the cylinder 10 relative to piston 50, chamber 52 is increased in volume causing transfer of hydraulic fluid from chamber 51 to chamber 52 in the cylinder 10 and through the piston 50. The hydraulic fluid flows at this time through the fixed orifice 104 in the valve assembly 60 and through the fixed orifices 66 in the valve disc 61, the check valve disc 80 opening the slot 71 in the disc 70. This flow occurs until such time as the volume flow increases above that to be carried by the aforesaid orifices, whereupon, valve assembly 55 moves bodily against the valve cage 95 and the compression spring 97 to open passages 65 fully to the necessary extent to accept flow of hydraulic fluid in full transfer between chambers 51 and 52. The openings 110 in the cage 95 provide for flow of hydraulic fluid from within the cage 95.

Excess fluid from the chamber 51, due to the differential volume between chambers 51 and 52, passes through the base valve 11 into the reservoir chamber 25.

On the rebound stroke of the shock absorber, that is, downward movement of the cylinder 10 relative to the piston 50, hydraulic fluid is transferred from chamber 52 into chamber 51 through the passages 100 in the piston 50. At this time, the check valve 80 of the valve assembly 55 is closed so that full flow of hydraulic fluid occurs first through the orifice 104 and thereafter, when flow requirements are greater than that accepted by the orifice 104, by lifting the valve assembly 60 against the compression of spring 107.

Because of the differential in the volume of chambers 52 and 51, hydraulic fluid will be received into the expanding volume of chamber 51 by the valve 30 lifting from its seat 31 to provide for flow of fluid from the reservoir chamber 25 into chamber 51.

While the embodiment of the present invention as herein disclosed constitutes a preferred form, it is to be understood that other forms might be adopted.

What is claimed is as follows:

1. In an hydraulic shock absorber, a control valve for the same including in the combination, a piston body having passage means therein for flow of fluid between opposite ends of said piston, a valve disc on one end of said piston closing said passage means against flow of fluid through the same, said valve disc having a plurality of orifices disposed in circular arrangement therein for flow of fluid through said valve disc before said valve disc opens said passage means, an orifice flow control disc positioned on said valve disc and having an opening therein having a length that is a multiple of the distance between the said orifices to provide for uncovering of a predetermined number of orifices irrespective of the radial position of the said opening relative to said valve disc, a check valve disc positioned on said orifice flow control disc to close said opening therein and prevent flow of fluid in one direction through said orifices, and resilient means operatively effective on said valve disc urging the same to maintain closed passage means.

2. In an hydraulic shock absorber, a control valve for the same including in the combination, a piston body having passage means therein for flow of fluid between opposite ends of said piston, said piston having a pair of annularly arranged annular seats on one end thereof, said passage means terminating at one end between said seats, a valve disc positioned on said seats closing said passage means against flow of fluid through the same, said valve disc having a plurality of orifices therein disposed between said seats, an orifice flow control disc positioned on said valve disc and having an opening therein having a length that is a multiple of the distance between said orifices to provide for uncovering of a predetermined number of orifices irrespective of the radial position of the said opening relative to the said orifices, a valve cage positioned above said orifice flow control disc urging the said disc and said valve disc toward said seats, said cage having a peripheral portion substantially in alignment with the outer of said seats for holding said valve disc upon the said seats, a check valve disc positioned within said valve cage and upon said orifice flow control disc to close the said opening therein to provide flow of fluid in one direction through said orifices, and resilient means engaging said valve cage to urge said valve disc upon said seats.

3. In a hydraulic shock absorber, a control valve for the same including in the combination, a piston having passage means therein for flow of fluid between opposite ends of said piston, a valve disk on one end of said piston closing said passage means against flow of fluid through the same, said valve disk having orifice means therein for flow of fluid through said valve disk before said valve disk opens said passage means, a check valve disk positioned on said valve disk to close said orifice means to prevent flow of fluid in one direction therethrough, a rigid retainer member positioned on said check valve disk retaining the same and said valve disk on said piston and having an annular radial extension spaced from said check valve disk providing a fixed stop limiting the degree of deflection of said check valve disk, a cup-shaped valve cage encircling said retainer and enclosing the annular radial extension thereof and said check valve disk with the edge periphery of the valve cage operably effective on said valve disk to maintain closed said passage means, said retainer extending axially through said valve cage and providing an axially extending guide portion for axial guiding movement of the cage, and resilient means around said guide portion and urging said cage toward said valve disk to maintain closed said passage means.

4. In an hydraulic shock absorber, a control valve for the same including in the combination, a piston body having passage means therein for flow of fluid between opposite ends of said piston, said piston having a pair of annularly arranged annular seats on one end thereof, said passage means terminating at one end between said seats, a valve disc positioned on said seats closing said passage means against flow of fluid through the same, said valve disc having a plurality of orifices therein disposed between said seats, an orifice flow control disk positioned on said valve disk and having an opening therein having a length that is a multiple of the distance between the said orifices to provide for uncovering of a predetermined number of orifices irrespective of the radial position of the said opening relative to said valve disk, a valve cage positioned above said valve disc and having the edge periphery thereof substantially axially aligned with the outer of said seats and cooperating with said valve disc to hold the same upon said seats, a check valve disc positioned on said orifice flow control disc within said valve cage for closing said opening therein against flow of fluid in one direction through said orifices, and resilient means engaging said valve cage to resiliently retain said valve disc upon said seats.

5. A control valve for a hydraulic shock absorber in accordance with claim 3 in which the said rigid retainer member is provided with grooves in the outer periphery thereof extending longitudinally of the said member and through said annular radial extension to provide for unrestricted flow of fluid from within said valve cage.

References Cited in the file of this patent

UNITED STATES PATENTS

| | | |
|---|---|---|
| 919,036 | Langer | Apr. 20, 1909 |
| 1,818,140 | Lang | Aug. 11, 1931 |
| 2,111,192 | Padgett | Mar. 15, 1938 |
| 2,138,513 | Rossman et al. | Nov. 29, 1938 |
| 2,496,952 | Mercier | Feb. 2, 1950 |
| 2,609,893 | Glassford | Sept. 9, 1952 |